United States Patent
Uplenchwar et al.

(10) Patent No.: US 9,655,102 B2
(45) Date of Patent: May 16, 2017

(54) INTERFERENCE CONTROL IN A CELLULAR COMMUNICATIONS NETWORK

(71) Applicant: UBIQUISYS LIMITED, Swindon (GB)

(72) Inventors: Pankaj Uplenchwar, Wiltshire (GB); Sandro Grech, Bath (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 4 days.

(21) Appl. No.: 14/311,031

(22) Filed: Jun. 20, 2014

(65) Prior Publication Data
US 2015/0373698 A1 Dec. 24, 2015

(51) Int. Cl.
*H04W 72/00* (2009.01)
*H04W 72/04* (2009.01)
*H04L 5/00* (2006.01)
*H04W 72/08* (2009.01)

(52) U.S. Cl.
CPC ....... *H04W 72/0426* (2013.01); *H04L 5/0035* (2013.01); *H04W 72/082* (2013.01)

(58) Field of Classification Search
CPC ..... H04W 72/04; H04W 16/12; H04W 24/00; H04W 16/14; H04W 80/04; H04L 1/0026; H04L 2012/5607; H04B 7/18567
USPC .................. 455/450–452.2, 63.1, 0.2, 67.13; 370/310.2, 317, 328
See application file for complete search history.

(56) References Cited

U.S. PATENT DOCUMENTS

| 6,141,565 | A | 10/2000 | Feuerstein et al. |
| 6,600,924 | B1 | 7/2003 | Sinivaara |
| 6,771,934 | B2 * | 8/2004 | Demers ................ H04B 1/7107 |
| | | | 375/148 |
| 7,151,937 | B2 | 12/2006 | Jin et al. |

(Continued)

FOREIGN PATENT DOCUMENTS

| CN | 102 271 414 | 12/2011 |
| CN | 104684052 A | 6/2015 |

(Continued)

OTHER PUBLICATIONS

"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.

(Continued)

*Primary Examiner* — Steve D Agosta
(74) *Attorney, Agent, or Firm* — Patent Capital Group

(57) ABSTRACT

A method of controlling interference in a cellular communications network comprises, in a first base station of the network: determining that the first base station is suffering from uncontrolled interference from at least one other base station of the network; based on information received from at least one other base station of the network regarding estimates of interference caused at the first base station by at least one user equipment device connected to the respective other base station, selecting a proposed action to mitigate said interference; and notifying the respective other base station of the selection of the proposed action.

20 Claims, 5 Drawing Sheets

(56) References Cited

U.S. PATENT DOCUMENTS

| | | | |
|---|---|---|---|
| 7,379,739 B2 | 5/2008 | Rajkotia et al. | |
| 7,884,763 B2 | 2/2011 | Na et al. | |
| 7,974,652 B2 * | 7/2011 | Gerlach | H04W 72/082 455/522 |
| 7,983,667 B2 | 7/2011 | Hart et al. | |
| 8,045,996 B2 | 10/2011 | Brunner et al. | |
| 8,107,950 B2 | 1/2012 | Amerijoo et al. | |
| 8,126,495 B2 | 2/2012 | Wu | |
| 8,145,223 B2 | 3/2012 | Guey | |
| 8,145,252 B2 | 3/2012 | Sung et al. | |
| 8,170,544 B1 | 5/2012 | Satapathy et al. | |
| 8,194,630 B2 * | 6/2012 | Qvarfordt | H04J 11/0093 370/338 |
| 8,208,937 B2 | 6/2012 | Zhang | |
| 8,229,451 B2 | 7/2012 | Frenger | |
| 8,270,976 B2 | 9/2012 | Simonsson et al. | |
| 8,275,376 B2 | 9/2012 | Vikberg | |
| 8,320,965 B2 | 11/2012 | Kwun | |
| 8,340,711 B1 | 12/2012 | Glass et al. | |
| 8,400,921 B2 | 3/2013 | Grayson et al. | |
| 8,483,743 B2 | 7/2013 | Dimou | |
| 8,538,337 B2 | 9/2013 | Damnjanovic | |
| 8,588,698 B2 | 11/2013 | Brisebois | |
| 8,611,299 B2 | 12/2013 | Yang et al. | |
| 8,619,563 B2 | 12/2013 | Madan et al. | |
| 8,639,243 B2 | 1/2014 | Radulescu et al. | |
| 8,687,585 B2 | 4/2014 | Marks et al. | |
| 8,694,044 B2 | 4/2014 | Hiltunen et al. | |
| 8,712,459 B2 | 4/2014 | Lim et al. | |
| 8,731,567 B2 | 5/2014 | Zhang | |
| 8,743,772 B2 | 6/2014 | Garavaglia et al. | |
| 8,755,791 B2 | 6/2014 | Bontu et al. | |
| 8,761,826 B2 | 6/2014 | Brown et al. | |
| 8,792,886 B2 | 7/2014 | Meshkati et al. | |
| 8,797,983 B2 | 8/2014 | Sun | |
| 8,805,373 B2 | 8/2014 | Chayat | |
| 8,830,936 B2 | 9/2014 | Ren | |
| 8,838,125 B2 | 9/2014 | Dalsgaard et al. | |
| 8,854,998 B2 | 10/2014 | Johansson et al. | |
| 8,862,134 B1 | 10/2014 | Zhou | |
| 8,874,126 B2 | 10/2014 | Jeong et al. | |
| 8,879,441 B2 | 11/2014 | Hunukumbure | |
| 8,983,470 B1 | 3/2015 | Ryan | |
| 9,014,004 B2 * | 4/2015 | Nuss | H04W 28/08 370/236 |
| 9,031,591 B2 | 5/2015 | Ma et al. | |
| 9,143,995 B2 | 9/2015 | Okmyanskiy et al. | |
| 9,148,838 B2 | 9/2015 | Yanover et al. | |
| 9,167,444 B2 | 10/2015 | Nuss et al. | |
| 9,197,358 B2 | 11/2015 | Hejazi | |
| 9,219,816 B2 | 12/2015 | Grayson | |
| 9,313,004 B2 | 4/2016 | Yanover et al. | |
| 9,332,458 B2 | 5/2016 | Nuss et al. | |
| 9,344,970 B2 | 5/2016 | Uplenchwar et al. | |
| 9,414,310 B2 | 8/2016 | Grayson | |
| 9,490,953 B2 | 11/2016 | Yanover et al. | |
| 9,497,708 B2 | 11/2016 | Uplenchwar et al. | |
| 9,544,857 B2 | 1/2017 | Carter et al. | |
| 9,559,798 B2 | 1/2017 | Nuss et al. | |
| 2002/0019245 A1 | 2/2002 | Longoni | |
| 2002/0061742 A1 | 5/2002 | Lapaille | |
| 2004/0085909 A1 | 5/2004 | Soliman | |
| 2004/0132486 A1 | 7/2004 | Halonen | |
| 2004/0213170 A1 | 10/2004 | Bremer | |
| 2005/0064820 A1 | 3/2005 | Park et al. | |
| 2005/0215251 A1 | 9/2005 | Krishnan | |
| 2005/0282572 A1 | 12/2005 | Wigard et al. | |
| 2006/0068712 A1 | 3/2006 | Kroboth et al. | |
| 2006/0073791 A1 * | 4/2006 | Senarath | H04W 52/146 455/67.13 |
| 2006/0229087 A1 | 10/2006 | Davis et al. | |
| 2006/0292989 A1 * | 12/2006 | Gerlach | H04W 16/12 455/63.1 |
| 2007/0008885 A1 | 1/2007 | Bonner | |
| 2007/0082620 A1 | 4/2007 | Zhang et al. | |
| 2007/0177501 A1 | 8/2007 | Papasakellariou | |
| 2007/0253372 A1 * | 11/2007 | Nakayasu | H04W 36/30 370/331 |
| 2007/0280170 A1 * | 12/2007 | Kawasaki | H04W 72/1231 370/331 |
| 2008/0004028 A1 | 1/2008 | Vincent | |
| 2008/0043623 A1 | 2/2008 | Franceschini | |
| 2008/0084844 A1 | 4/2008 | Reznik | |
| 2008/0107074 A1 | 5/2008 | Salmenkaita et al. | |
| 2008/0139197 A1 | 6/2008 | Misra et al. | |
| 2008/0188234 A1 | 8/2008 | Gorokhov | |
| 2008/0188265 A1 | 8/2008 | Carter et al. | |
| 2008/0268833 A1 | 10/2008 | Huang | |
| 2009/0005030 A1 | 1/2009 | Han | |
| 2009/0054047 A1 | 2/2009 | Kylvaja | |
| 2009/0067370 A1 | 3/2009 | Kim | |
| 2009/0081955 A1 | 3/2009 | Necker | |
| 2009/0092088 A1 | 4/2009 | Kokku | |
| 2009/0129284 A1 | 5/2009 | Jung et al. | |
| 2009/0129291 A1 | 5/2009 | Gupta | |
| 2009/0232074 A1 | 9/2009 | Yang et al. | |
| 2009/0270109 A1 * | 10/2009 | Wang Helmersson | H04W 52/367 455/453 |
| 2009/0323530 A1 | 12/2009 | Trigui et al. | |
| 2010/0009634 A1 * | 1/2010 | Budianu | H04W 52/244 455/63.1 |
| 2010/0029282 A1 | 2/2010 | Stamoulis et al. | |
| 2010/0034157 A1 | 2/2010 | Stolyar et al. | |
| 2010/0056184 A1 | 3/2010 | Vakil | |
| 2010/0093358 A1 | 4/2010 | Cheong et al. | |
| 2010/0099424 A1 | 4/2010 | Centonza | |
| 2010/0105406 A1 | 4/2010 | Luo et al. | |
| 2010/0110989 A1 | 5/2010 | Wu | |
| 2010/0112982 A1 | 5/2010 | Singh et al. | |
| 2010/0124930 A1 | 5/2010 | Andrews | |
| 2010/0177722 A1 | 7/2010 | Guvenc | |
| 2010/0227611 A1 | 9/2010 | Schmidt et al. | |
| 2010/0233962 A1 * | 9/2010 | Johansson | H04W 52/343 455/63.1 |
| 2010/0240314 A1 | 9/2010 | Chang | |
| 2010/0260036 A1 | 10/2010 | Molnar et al. | |
| 2010/0260068 A1 | 10/2010 | Bhatt et al. | |
| 2010/0267338 A1 | 10/2010 | Chiu | |
| 2010/0267408 A1 | 10/2010 | Lee et al. | |
| 2010/0275083 A1 | 10/2010 | Nam et al. | |
| 2010/0279628 A1 | 11/2010 | Love et al. | |
| 2010/0285795 A1 | 11/2010 | Whinnett | |
| 2010/0309864 A1 * | 12/2010 | Tamaki | H04W 52/42 370/329 |
| 2010/0311449 A1 | 12/2010 | Whinnett | |
| 2010/0317351 A1 | 12/2010 | Gerstenberger | |
| 2011/0034174 A1 | 2/2011 | Xu | |
| 2011/0039539 A1 | 2/2011 | Maida et al. | |
| 2011/0039570 A1 | 2/2011 | Maida et al. | |
| 2011/0077016 A1 | 3/2011 | Stolyar et al. | |
| 2011/0086614 A1 | 4/2011 | Brisebois | |
| 2011/0092209 A1 | 4/2011 | Gaal | |
| 2011/0110316 A1 | 5/2011 | Chen et al. | |
| 2011/0128862 A1 | 6/2011 | Kallin | |
| 2011/0136478 A1 | 6/2011 | Trigui | |
| 2011/0151877 A1 | 6/2011 | Tafreshi | |
| 2011/0151881 A1 | 6/2011 | Chou | |
| 2011/0176497 A1 | 7/2011 | Gopalakrishnan | |
| 2011/0182375 A1 | 7/2011 | Kim et al. | |
| 2011/0194423 A1 | 8/2011 | Cho et al. | |
| 2011/0195730 A1 * | 8/2011 | Chami | H04W 52/244 455/501 |
| 2011/0201277 A1 | 8/2011 | Eguchi | |
| 2011/0211514 A1 | 9/2011 | Hamalainin | |
| 2011/0223964 A1 | 9/2011 | Ebiko | |
| 2011/0235598 A1 * | 9/2011 | Hilborn | H04W 52/143 370/329 |
| 2011/0250881 A1 | 10/2011 | Michel et al. | |
| 2011/0287755 A1 | 11/2011 | Cho | |
| 2011/0306347 A1 | 12/2011 | Choi | |
| 2011/0310879 A1 | 12/2011 | Wu | |

(56) References Cited

U.S. PATENT DOCUMENTS

| | | |
|---|---|---|
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0046026 A1 | 2/2012 | Chande |
| 2012/0046028 A1 | 2/2012 | Damnjanovic |
| 2012/0046063 A1 | 2/2012 | Chande |
| 2012/0083201 A1 | 4/2012 | Truong |
| 2012/0087247 A1 | 4/2012 | Min et al. |
| 2012/0087266 A1* | 4/2012 | Vajapeyam .......... H04J 11/0056 370/252 |
| 2012/0100849 A1 | 4/2012 | Marsico |
| 2012/0129537 A1 | 5/2012 | Liu et al. |
| 2012/0176980 A1 | 7/2012 | Moon et al. |
| 2012/0178451 A1 | 7/2012 | Kubota |
| 2012/0231797 A1 | 9/2012 | Van Phan et al. |
| 2012/0236774 A1 | 9/2012 | Guey et al. |
| 2012/0238263 A1 | 9/2012 | Caretti et al. |
| 2012/0258720 A1 | 10/2012 | Tinnakornsrisuphap et al. |
| 2012/0265888 A1 | 10/2012 | Roeland et al. |
| 2012/0270536 A1 | 10/2012 | Ratasuk |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0029669 A1 | 1/2013 | Boudreau et al. |
| 2013/0077482 A1 | 3/2013 | Krishna et al. |
| 2013/0079007 A1 | 3/2013 | Nagaraja et al. |
| 2013/0107798 A1 | 5/2013 | Gao et al. |
| 2013/0109380 A1 | 5/2013 | Centonza |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0157680 A1 | 6/2013 | Morita |
| 2013/0163543 A1 | 6/2013 | Freda et al. |
| 2013/0182680 A1 | 7/2013 | Choi et al. |
| 2013/0210431 A1 | 8/2013 | Abe |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0279403 A1 | 10/2013 | Takaoka |
| 2013/0294356 A1 | 11/2013 | Bala et al. |
| 2013/0308531 A1 | 11/2013 | So et al. |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0029524 A1 | 1/2014 | Dimou et al. |
| 2014/0056220 A1 | 2/2014 | Poitau et al. |
| 2014/0056278 A1 | 2/2014 | Marinier et al. |
| 2014/0073304 A1 | 3/2014 | Brisebois |
| 2014/0078986 A1 | 3/2014 | Kaippallimalil et al. |
| 2014/0086226 A1 | 3/2014 | Zhao et al. |
| 2014/0092765 A1 | 4/2014 | Agarwal et al. |
| 2014/0112251 A1 | 4/2014 | Kim et al. |
| 2014/0113643 A1 | 4/2014 | Ma et al. |
| 2014/0126537 A1 | 5/2014 | Chen et al. |
| 2014/0146732 A1 | 5/2014 | Olufunmilola et al. |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0170965 A1 | 6/2014 | Li |
| 2014/0171143 A1 | 6/2014 | Liu |
| 2014/0185467 A1 | 7/2014 | Heo |
| 2014/0198678 A1 | 7/2014 | Kim et al. |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0219197 A1 | 8/2014 | Chaudhuri |
| 2014/0220990 A1 | 8/2014 | Lorca Hernando |
| 2014/0226736 A1 | 8/2014 | Niu et al. |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0273852 A1 | 9/2014 | McCormack et al. |
| 2014/0274195 A1 | 9/2014 | Singh |
| 2014/0293906 A1 | 10/2014 | Chang et al. |
| 2014/0302859 A1 | 10/2014 | Nama et al. |
| 2014/0328277 A1 | 11/2014 | Xiao et al. |
| 2014/0335909 A1 | 11/2014 | Czerepinski |
| 2015/0011222 A1 | 1/2015 | Brisebois et al. |
| 2015/0011229 A1 | 1/2015 | Morita et al. |
| 2015/0018028 A1 | 1/2015 | Uplenchwar et al. |
| 2015/0038190 A1 | 2/2015 | Carter et al. |
| 2015/0055479 A1 | 2/2015 | Reider |
| 2015/0063223 A1 | 3/2015 | Shen |
| 2015/0063231 A1 | 3/2015 | Seo et al. |
| 2015/0087325 A1 | 3/2015 | Nuss et al. |
| 2015/0138981 A1 | 5/2015 | Nuss et al. |
| 2015/0141027 A1 | 5/2015 | Tsui et al. |
| 2015/0146594 A1 | 5/2015 | Grayson |
| 2015/0148036 A1 | 5/2015 | Grayson |
| 2015/0208425 A1 | 7/2015 | Caretti et al. |
| 2015/0237588 A1 | 8/2015 | Zhao et al. |
| 2015/0256314 A1 | 9/2015 | Gauvreau et al. |
| 2015/0312778 A1 | 10/2015 | Chandrasekhar et al. |
| 2015/0318994 A1 | 11/2015 | Walsh et al. |
| 2015/0351072 A1 | 12/2015 | Okmyanskiy et al. |
| 2015/0365855 A1 | 12/2015 | Nuss et al. |
| 2015/0382367 A1 | 12/2015 | Yanover et al. |
| 2016/0073426 A1 | 3/2016 | Bull et al. |
| 2016/0127069 A1 | 5/2016 | Nuss et al. |
| 2016/0150442 A1 | 5/2016 | Kwan |
| 2016/0157126 A1 | 6/2016 | Nuss et al. |
| 2016/0165485 A1 | 6/2016 | Kwan |
| 2016/0198412 A1 | 7/2016 | Uplenchwar et al. |
| 2016/0219596 A1 | 7/2016 | Yanover et al. |
| 2016/0242122 A1 | 8/2016 | Yue |
| 2016/0309356 A1 | 10/2016 | Madan et al. |
| 2016/0309476 A1 | 10/2016 | Madan et al. |
| 2016/0373202 A1 | 12/2016 | Nuss et al. |

FOREIGN PATENT DOCUMENTS

| | | |
|---|---|---|
| EP | 1322048 | 6/2003 |
| EP | 1718090 | 11/2006 |
| EP | 1895801 | 3/2008 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2533595 | 12/2012 |
| EP | 2566261 | 3/2013 |
| EP | 2632072 | 8/2013 |
| EP | 2728926 | 5/2014 |
| EP | 2741533 | 6/2014 |
| EP | 2306761 | 7/2014 |
| EP | 2770773 | 8/2014 |
| EP | 2832150 | 2/2015 |
| EP | 2879444 | 6/2015 |
| GB | 2496908 | 5/2013 |
| GB | 2518584 | 4/2015 |
| WO | WO98/24199 | 6/1998 |
| WO | WO00/38351 | 6/2000 |
| WO | WO2007/074373 | 7/2007 |
| WO | WO2007/133135 | 11/2007 |
| WO | WO2010/006909 | 1/2010 |
| WO | WO2010/018929 | 2/2010 |
| WO | WO2010/064110 | 6/2010 |
| WO | WO2010/125151 | 11/2010 |
| WO | WO2011/085238 | 7/2011 |
| WO | WO2011/088465 | 7/2011 |
| WO | WO2011/090908 | 7/2011 |
| WO | WO2011/137345 | 11/2011 |

(56) References Cited

FOREIGN PATENT DOCUMENTS

| | | |
|---|---|---|
| WO | WO2012/148009 | 1/2012 |
| WO | WO2012/055984 | 5/2012 |
| WO | WO2012/079604 | 6/2012 |
| WO | WO2013/005016 | 1/2013 |
| WO | WO2013/041574 | 3/2013 |
| WO | WO2013/079913 | 6/2013 |
| WO | WO2013/082245 | 6/2013 |
| WO | WO2013/086659 | 6/2013 |
| WO | WO2013/112082 | 8/2013 |
| WO | WO2013/144950 | 10/2013 |
| WO | WO2013/169991 | 11/2013 |
| WO | WO2014/001025 | 3/2014 |
| WO | WO2014/059935 | 4/2014 |
| WO | WO2014/064674 | 5/2014 |
| WO | WO2014/071308 | 5/2014 |
| WO | WO2014/087392 | 6/2014 |
| WO | WO2014/087393 | 6/2014 |

OTHER PUBLICATIONS

"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010; See Section 4, pp. 15-46.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.

"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.

"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.

"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.

"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Lucioles, F-06921 Sophia Antipolis Cedex—France, Sep. 2014; 86 pages.

"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].

"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.

"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.

"ETSI TS 125 469 v11.2.0, Universal Mobile Telecommunications System (UMTS); UTRAN Iuh interface Home Node B (HNB); Application Part (HNBAP) signalling (3GPP T525.469 version 11.2.0 Release 11)," European Telecommunications Standards Institute, 650 Route des Lucioles, F-06921 Sophia Antipolis Cedex, France, Apr. 2013, 78 pages.

"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.

"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.

"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.

"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP Ts 29.061 version 12.7.0 Release 12)," ETSI, 650 Route des Lucioles, F-06921, Sophia Antipolis Cedex—France, Oct. 2014; 170 pages.

"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.

"ETSI TS 129 213 V12.5.0 (Oct. 2014) Technical Specification: Digital Cellular Telecommunications System (Phase 2+); Universal Mobile Telecommunications System (UMTS); LTE; Policy and

(56) References Cited

OTHER PUBLICATIONS charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.
"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.
"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route des Lucioles F-06921 Sophia Antipolis Cedex—France, Oct. 2015 Sections 1 thru 9 only; 252 pages.
"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.
"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.
"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.
"ETSI TS 136 300 V12-7-0 (Oct. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.
"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sophia Antipolis Cedex—France, Nov. 2015; 40 pages.
"ETSI TS 136 321 V12.7.0 (Oct. 2015) Technical Specification: LTE; Evolved Universal Terrestrial Radio Access (E-UTRA); Medium Access Control (MAC) protocol specification (3GPP TS 36.321 version 12.7.0 Release 12);" ETSI, European Telecommunications Standards Institute, 650 Route des Lucioles F-06921 Sophia Antipolis Cedex—France, Oct. 2015; 79 pages.
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex—France, Sep. 2014.
"ETSI TS 136 331 V12.7.0 (Oct. 2015) Technical Specification: LTE; Evolved Universal Terrestrial Radio Access (E-UTRA); Radio Resource Control (RRC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.
"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0 Release 8);" ETSI, European Telecommunications Standards Institute 2012, 650 Route des Lucioles F-06921 Sophia Antipolis Cedex—France; Nov. 2008.
"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 213 V 12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.
"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0

(56) References Cited

OTHER PUBLICATIONS

Release 10)," ETSI, European Telecommunications Standards Institute 2012, 650 Route des Lucioles, F-06921 Sophia Antipolis Cedex—France, Jan. 2011; 208 pages.
"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.
"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.
"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.
"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.
"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.
"3GPP LTE Packet Data Convergence Protocol (PDCP) Sub Layer," EventHelix.com Inc., first published on or about Jan. 1, 2010; 20 pages.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.
"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles—Sophia Antipolis Valbonne—France, Jun. 2015; Sections 4 and 5 only.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.
"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.
"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.
"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.
"3GPP TS 32.522 v11.2.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.
"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F-06921 Sophia-Antipolis Cedex; France; Sep. 2012, 205 pages.

(56) References Cited

OTHER PUBLICATIONS

"3GPP TS 36.413 V9.5.1 (Jan. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.
"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.
"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Centre; 650, Route Des Lucioles; F-06921 Sophia-Antipolis Cedex; France; Sep. 2012, 21 pages.
"3GPP TS 48.008 V8.8.0 (Dec. 2009) Technical Specification: 3rd Generation Partnership Project; Technical Specification Group GSM/EDGE Radio Access Network; Mobile Switching Centre—Base Station System (MSC-BSS) interface; Layer 3 specification (Release 8);" 3rd Generation Partnership Project, Mobile Competence Centre; 650, Route Des Lucioles; F-06921 Sophia-Antipolis Cedex; France; Dec. 2009; 208 pages.
"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Antipolis Cedex; France; Oct. 2007, XP050423659.
3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia-Antipolis; Sep. 2012; XP050662177.
3GPP Draft R3-071432, Telecom Italia, et al., "Self-optimization use case: self-tuning of cell reselction parameters for load balancing," 3rd Generation Partnership Project (3GPP), Mobile Competence Centre; 650; Route Des Lucioles; F-06921 Sophia-Antipolis; Aug. 2007 XP050162260.
3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the Egyptian National Telecommunications Regulatory Authority (NTRA); 75 pages First Published on or about Sep. 15, 2015.
Adrangi, F., et al., "Chargeable User Identity," Network Working Group RFC 4372, Jan. 2006, 10 pages.
Andrews, Matthew, et al., "Optimal Utility Based Multi-User Throughput Allocation Subject to Throughput Constraints," IEEE INFOCOM 2005, Mar. 13-17, 2005, Miami, FL; 10 pages.
Ashraf, Imran, "Distributed Radio Coverage Optimization in Enterprise Femtocell Networks," International Conference on Communications ICC 2010, May 23-27, 2010, Cape Town, South Africa; 6 pages.

Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages https://hal.inria.fr/hal-00763374.
Basir, Adnan, "3GPP Long Term Evolution (LTE), ICIC and eICIC," posted Jun. 11, 2012; 5 pages; http://4g-lte-world-blogspot.com/2012/06/icic-and-eicic.html.
Bernardos, Carlos J., et al., "Challenges of Designing Jointly the Backhaul and Radio Access Network in a Cloud-based Mobile Network," Future Network & Mobile Summit 2013 Conference Proceedings, Jul. 2013; 10 pages.
"Bisection Method," Wikipedia, the free encyclopedia, Aug. 26, 2015; 5 pages.
"Block Error Ratio (BLER) Measurement Description," Keysight Technologies, Feb. 28, 2014; 3 pages http://rfmw.em.keysight.com/rfcomms/refdocs/wcdma/wcdma_meas_wblerror_desc.html.
"Broadband Forum Technical Report: TR-069 CPE WAN Management Protocol," Issue: 1, Amendment 4, Issue Date: Jul. 2011 Protocol Version 1.3; © The Broadband Forum; 190 pages.
"Broadband Forum Technical Report: TR-069 CPE WAN Management Protocol," Issue: 1, Amendment 5, Issue Date: Nov. 2013 CWMP Version 1.4; © The Broadband Forum; 228 pages.
"Broadband Forum Technical Report: TR-196 Frmto Access Point Service Data Model," Issue: 2, Issue Date: Nov. 2011; 46 pages.
Calhoun, P., "Diameter Base Protocol," Network Working Group RFC 3488, Sep. 2003; 147 pages.
Chauhan, Himanshu, "UE Measurements and Reporting in UMTS," Wireless Technologies, Blog dated Apr. 26, 2013; 3 pages http://worldtechieumts.blogspot.com/2013/04/ue-measurements-and-reporting-in-umts.html.
"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
"Cisco's One Platform Kit (onePK)," Networking Software (IOS & NX-OS), Cisco Systems, Inc., First published on or about Mar. 3, 2014; 2 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Do, Dr. Michelle M., et al., "Interference Coordination in LTE/LTE-A (2): eICIC (enhanced ICIC)," Netmanias Tech Blog, Aug. 6, 2014; 6 pages http://www.netmanias.com/en/post/blog/6551/lte-lte-a-eicic/interference-coordination-in-lte-lte-a-2-eicic-enhanced-icic.
Droms, R., "Dynamic Host Configuration Protocol," Network Working Group RFC 2131, Mar. 1997; 45 pages.
"E Band," from Wikipedia, the free encyclopedia, Dec. 24, 2013; 3 pages.
"EEM Configuration for Cisco Integrated Services Router Platforms," Configuration Guide for Cisco IOS® Embedded Event Manager (EEM), Cisco Systems, Inc., Feb. 2008; 17 pages.
"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.
Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.
Ericsson, et al., "LPN Range Expansion in Co-Channel Deployment in Heterogeneous Networks," 3GPP Draft R1-125219,, 3rd Generation Partnership Project (3GPP), Mobile Competence Centre; 650; Route Des Lucioles; F-06921 Sophia-Antipolis; Nov. 2012, 7pages.
Ericsson, et al., "On the Feasibility of Operational Carrier Selection," 3GPP Draft R3-112991 , 3rd Generation Partnership Project

(56) References Cited

OTHER PUBLICATIONS (3GPP), Mobile Competence Centre; 650; Route Des Lucioles; F-06921 Sophia-Antipolis; Nov. 2011, 7 pages.
"Fading," from Wikipedia, the free encyclopedia, Apr. 10, 2015; 6 pages.
"Frame Structure—Downlink," Share Technote, first published on or about Jul. 9, 2012; 13 pages; http://www.sharetechnote.com/html/FrameStructure_DL_html.
"Fuzzy Logic," from Wikipedia, the free encyclopedia, Dec. 3, 2015; 12 pages.
Freescale Semiconductor, "Long Term Evolution Protocol Overview," White Paper, Document No. LTEPTCLOVWWP, Oct. 2008; 21 pages.
Ghaffar, Rizwan, et al., "Fractional Frequency Reuse and Interference Suppression for OFDMA Networks," published in "WiOpt"10: Modeling and Optimization in Mobile, Ad Hoc, and Wireless Networks (2010), Jul. 19, 2010, 5 pages.
Goldsmith, A.J., et al., "Variable Rate Variable-Power MQAM for Fading Channels," IEEE Trans. on Comm. vol. 45, No. 10, Oct. 1997.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Yliopisto , University of Oulu, Department of Computer Science and Engineering; Oct. 2013, 66 pages.
Holbrook, H., et al., "Source-Specific-Multicast for IP," Network Working Group RFC 4607, Aug. 2006.
Horn, Gavin, "3GPP Femtocells: Architecture and Protocols," Qualcomm Incorporated, 5775 Morehouse Drive, San Diego, CA, Sep. 2010; 64 pages.
"Hysteresis," from Wikipedia, the free encyclopedia; Oct. 1, 2015.
"Hybrid Automatic Repeat Request," from Wikipedia, the free encyclopedia, Jun. 8, 2015; 4 pages.
Ku, Gwanmo, "Resource Allocation in LTE," Adaptive Signal Processing and Information Theory Research Group, Nov. 11, 2011; 33 pages.
Kwan, R., et al., "A Survey of Scheduling and Interference Mitiation in LTE," vol. 2010, Article ID 273486, May 30, 2010.
Kwan, R., et al., "On Radio Admission Control for LTE Systems," Proc. of IEEE VTC-fail, Sep. 6-9, 2010.
La Rocca, Maurizio, "RSRP and RSRQ Measurement in LTE," laroccasolutions Technology & Services, Feb. 2, 2015; 9 pages http://www.laroccasolutions.com/training/78-rsrp-and-rsrq-measurement-in-lte.
Leung, K., et al., "WiMAX Forum/3GPP2 Proxy Mobile IPv4," Independent Submission RFC 5563, Feb. 2010; 41 pages.
Lopez-Perez, D., et al., "Interference Avoidance and Dynamic Frequency Planning for WiMAX Femtocells Networks," Proceedings of ICCS, Jun. 23-25, 2008.
LteWorld, "Packet Data Convergence Protocol (PDCP)," Information Page, LteWorld.org, published on or about Jan. 2, 2013; 2 pages.
"Link Layer Discovery Protocol," Wikipedia, the free encyclopedia, 4 pages, [Retrieved and printed Nov. 17, 2013] http://en.wikipedia.org/wiki/Link_Layer_Discovery_Protocol.
"LTE Physical Layer Overview," Keysight Technologies, First published on or about Aug. 24, 2014; 11 pages http://rfmw.em.keysight.com/wireless/helpfiles/89600B/webhelp/subsystems/lte/content/lte_overview.htm.
"LTE Frame and Subframe Structure," Cellular/Mobile Telecommunications, Tutorial, Radio-Electronics.com; first published on or about Aug. 6, 2009 http://www.radio-electronics.com/info/cellulartelecomms/lte-long-term-evolution/lte-frame-subframe-structure.php.
"LTE Layers Data Flow," LTE Tutorial, tutorialspoint; first published on or about Jan. 17, 2013; 3 pages http://www.tutorialspoint.com/lte/lte_layers_data_flow.htm.
"LTE Protocol Stack Layers," LTE Tutorial, tutorialspoint; first published on or about Jan. 16, 2013 http://www.tutorialspoint.com/lte/lte_protocol_stack_layers.htm.
"LTE Quick Reference," from Share Technote; first published on or about Nov. 28, 2012 http://www.sharetechnote.com/html/Handbook_LTE_RNTI.html.
"LTE Quick Reference: CCE Index Calculation," LTE Handbook, Share Technote, first published on or about Jul. 8, 2012 http://www.sharetechnote.com/html/Handbook_LTE_CCE_Index.html.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"LTE TDD Overview," from ShareTechnote; first published on or about Jul. 2, 2014 http://www.sharetechnote.com/html/LTE_TDD_Overview.html.
Madan, Ritesh, et al., "Fast Algorithms for Resource Allocation in Wireless Cellular Networks," IEEE/ACM Transactions on Networking, vol. 18, No. 3, Jun. 2010; 12 pages.
Mehlfuhrer, M., et al., "Simulating the Long Term Evolution Physical Layer," Proc. of 17th European Signal Processing Conference (EUSIPCO), Aug. 24-28, 2009.
Narten T., et al., "Neighbor Discovery for IP version 6 (IPv6)," Network Working Group RFC 4861, Sep. 2007; 97 pages.
NGMN Alliance, "Further Study on Critical C-RAN Technologies," Next Generation Mobile Networks, Mar. 31, 2015; 93 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
Nokia Corporation, et al., "SON WI Status Overview," 3GPP Draft R2-093231, 3rd Generation Partnership Project (3GPP), Mobile Competence Centre; 650; Route Des Lucioles; F-06921 Sophia-Antipolis; Apr. 2009.
Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.
Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.
Park, Jeongho, et al., "Interference Level Control in Mobile WiMAX Uplink System," 2009 IEEE Mobile WiMAX Symposium, Jul. 9-10, 2009; 5 pages.
"Paging Channel Selection," UMTS World; first published on or about Jun. 22, 2003; 3 pages http://www.umtsworld.com/technology/paging.html.
"Paging Indicator Channel PICH Work in 3G," Teletopix.org, Telecom Techniques Guide, Feb. 13, 2014, 2 pages http://www.teletopix.ore3g-wcdma/paging-indicator-channel-pich-work-in-3g/.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"Plane (in networking)," Definition from WhatIs.com; Jan. 2013 http://whatis.techtarget.com/definition/plane-in-networking.
Piro, G., et al., "An LTE module for the ns-3 Network Simulator," in Proc. of Wns3 2011 (in conjunction with SimuTOOLS 2011), Mar. 2011, Barcelona Spain.
Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.

(56) References Cited

OTHER PUBLICATIONS

"Quadrature amplitude modulation," from Wikipedia, the free encyclopedia, Apr. 22, 2015; 11 pages.
"QoS Class Identifier," from Wikipedia, the free encyclopedia, Oct. 7, 2015.
"RADIUS," Wikipedia, the free encyclopedia, 12 pages [Retrieved and printed Oct. 11, 2013] http://en.wikipedia.orewiki/RADIUS.
"Received signal strength indication," Wikipedia, the free encyclopedia, Dec. 22, 2014; 2 pages.
Rengarajan, Balaji, "A Semi-autonomous Algorithm for Self-organizing Dynamic Fractional Frequency Reuse on the Uplink of OFDMA Systems," Dec. 14, 2009; 22 pages.
"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.
Ruby, Ruksana, et al., "Uplink Scheduling Solution for Enhancing Throughput and Fairness in Relayed Long-Term Evoluation Networks," IET Communications 2014, vol. 8, Issue 6, Apr. 2014; 13 pages.
Saad, Sawsan A., et al., "A Survey on Power Control Techniques in Femtocell Networks," Journal of Communications vol. 8, No. 12, Dec. 2013; 10 pages.
Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.
Salim, Umer, et al., "State-of-the-art of and promising candidates for PHY layer approaches on access and backhaul network," INFSO-ICT-317941 iJOIN D 2.1, iJOIN GA, Nov. 4, 2013; 129 pages.
Seo, H., et al., "A proportional-fair power allocation scheme for fair and efficient multiuser OFDM systems," in Proc. of IEEE GLOBECOM, Dec. 2004, Dallas (USA).
Stefan Schwarz etal: "Low complexity approximate maximum throughput scheduling for LTE," 2010 44th Asilomar Conference on Signals, Systems and Computers, Nov. 7-10, 2010, XP031860825, DOI:10.1109/ACSSC.2010.5757800ISBN:978-1-4244-9722-5 p. 1563-p. 1565.
Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.
Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.
Tayal, Nitin, "All About PDCCH and CCE Allocation," Tayal's Way to Learn LTE, Tutorial Blog dated May 2013, 14 pages http://nitintayal-lte-tutorials.blogspot.com/2013/05/all-about-pdcch-and-cce-allocation.html.
Thapa, Chandra, et al., "Comparative Evaluation of Fractional Frequency Reuse (FRF) and Traditional Frequency Reuse in 3GPP-LTE Downlink," International Journal of Mobile Netework Communications & Telematics (IJMNCT) vol. 2, No. 4, Aug. 2012; 8 pages.
"Transmission Time Interval," from Wikipedia, the free encyclopedia, May 2, 2013.
"TR-196 Femto Access Point Service Data Model, Issue: 2, Issue Date: Nov. 2011," Broadband Forum Technical Report; 46 pages.
UKIPO Mar. 27, 2012 Search Report from GB Patent Application Serial No. GB1120462.5.
UKIPO Jan. 19, 2013 Search Report from GB Patent Application Serial No. GB1120462.5.
Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.
Wanda, Alex, "UMTS UTRANN Block Error Rate (BLER) Measurements," Telecom Insights, Jan. 2011; 3 pages http://trends-in-telecoms.blogspot.com/2011/01/umts-utrans-block-error-rate-rate-bler.html.
Wang, Jiao, "Dynamic Centralized Interference Coordination in Femto Cell Network with QoS Provision," Latest Trends on Communications, Proceedings of the 18th International Conference on Communications (Part of CSCC '14), Jul. 17-21, 2014; 6 pages.
Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.
"Whats is Uplink RSSI in LTE," TelecomSource thread, May 22, 2013; 5 pages http://www.telecomsource.net/howthread.php?5464-Whats-is-Uplink-RSSI-in-LTE.
Wubben, Dirk, et al., "Benefits and Impact of Cloud Computing on 5G Signal Processing," IEEE Signal Processing Magazine, Nov. 2014.
Xiong, Chao, "Enhanced ICIC for LTE-A HetNet," ZTE Corporation, LTE World Summit 2012, May 2012; 3 pages.
Zyren, Jim, "Overview of the 3GPP Long Term Evolution Physical Layer," White Paper, Freescale Semiconductor, Document No. 3GPPEVOLUTIONWP; Jul. 2007; 27 pages.
EPO Jul. 29, 2014 Extended Search Report from European Application Serial No. EP13195673, 12 pages.
EPO Aug. 12, 2014 Extended Epo Search Report and Opinion from European Application Serial No. 13195780.8.
EPO Nov. 19, 2015 Extended Search Report and Written Opinion from European Application EP13767700; 9 pages.
EPO Mar. 26, 2015 Extended Search Report and Opinion from European Application Serial No. EP14190541.
PCT Jul. 16, 2013 International Search Report and Written Opinion from International Application PCT/IL2013/050269, 3 pages.
PCT Oct. 1, 2014 International Preliminary Report on Patentability from International Application PCT/IL2013/050269, 4 pages.
PCT Mar. 17, 2014 International Search Report and Written Opinion from International Application Serial No. PCT/IL2013/000086, 12 pages.
PCT Jun. 16, 2014 International Search Report and Written Opinion of the International Searching Authority for International Application Serial No. PCT/IL2013/000085.
PCT—Feb. 13, 2013 International Search Report and Written Opinion from International Application PCT/GB2012/052511; 28 pages.
EPO Jan. 27, 2016 Extended Search Report and Written Opinion from European Application Serial No. 15183582.4; 6 pages.
Sabella, Dario, et al., "RAN as a Service: Challenges of Designing a Flexible RAN Architecture in a Cloud-based Heterogeneous Mobile Network," Future Network Summit Conference, Lisbon, Portugal, Jul. 3-5, 2013; 8 pages.
PCT Mar. 27, 2014 International Search Report and Written Opinion from International Application PCT/IL2013/000080, 10 pages.
PCT Apr. 28, 2015 International Preliminary Report on Patentability and Written Opinion from International Application PCT/IL2013/000080.
ILPO May 13, 2015 Search Report from Israel Application Serial No. IL222709 [Only partially translated].
Nokia Siemens Networks et al: "Enhanced ICIC considerations for HetNet scenarios", 3GPP Draft; R1-103822_EICIC_Overview, 3rd Generation Partnership Project (3GPP), Mobile Competence Centre; 650, Route Des Lucioles; F-06921 Sophia-Antipolis Cedex; France, vol. RAN WG1, no. Dresden, Germany; 20100628-20100702, Jun. 22, 2010 (Jun. 22, 2010), XP050598481, [retrieved on Jun. 22, 2010] Section 3, 4 pages.
Qualcomm Incorporated: "Introduction of enhanced ICIC", 3GPP Draft; R2-106246, 3rd Generation Partnership Project (3GPP), Mobile Competence Center; 650, Route Des Lucioles; F-06921 Sophia-Antipolis Cedex; France, vol. Ran WG2, no. Jacksonville, USA; 20101115, Nov. 9, 2010 (Nov. 9, 2010), XP050492195, [retrieved on Nov. 9, 2010] Section 16.X.2, 5 pages.

(56) References Cited

OTHER PUBLICATIONS

"3GPP TS 36.300 V9.7.0 (Mar. 2011) Technical Specification: 3rd Generation Partnership Project; Technical Specification Group Radio Access Network; Evolved Universal Terrestrial Radio access (E-UTRA) and Evolved Universal Terrestrial Radio Access Network (E-UTRAN); Overall description; Stage 2 (Release 9)," 3GPP, 650 Route des Lucioles—Sophia Antipolis Valbonne—France, Mar. 2011; 173 pages.
U.S. Appl. No. 14/845,995, filed Sep. 4, 2015, entitled "Method and System for Dynamic Allocation of Resources in a Cellular Network," Inventors: Vladimir Yanover, et al.
U.S. Appl. No. 14/809,201, filed Jul. 25, 2015, entitled "System and Method to Facilitate Small Cell Uplink Power Control in a Network Environment," Inventors: Ritesh K. Madan, et al.
U.S. Appl. No. 14/833,519, filed Aug. 24, 2015, entitled "System and Method to Facilitate Small Cell Uplink Powercontrol in a Network Environment," Inventors: Ritesh K. Madan et al.
U.S. Appl. No. 14/818,084, filed Aug. 4, 2015 entitled "Resource Adaptation for Frequency Domain Downlink Inter-Cell Interference Coordination," Inventors: Ritesh K. Madan et al.
U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.
U.S. Appl. No. 14/811,580, filed Jul. 28, 2015 entitled "Determining Fractional Frequency Reuse Power Levels for Downlink Transmissions," Inventor: Ritesh K. Madan.
U.S. Appl. No. 14/816,957, filed Aug. 3, 2015 entitled "Selecting Cells for Downlink Inter-Cell Interference Coordination," Inventors: Rohit U. Nabar et al.
U.S. Appl. No. 14/816,990, filed Aug. 3, 2015 entitled "User Equipment Power Level Selection for Downlink Transmissions," Inventors: Vikram Chandrasekhar et al.
U.S. Appl. No. 14/679,868, filed Apr. 6, 2015, entitled "System and Method for Managing Interference in a Network Environment Based on User Presence," Inventors: Mark Grayson, et al.
U.S. Appl. No. 14/687,198, filed Apr. 15, 2015, entitled "System and Method for Managing Interference in a Network Environment Based on User Presence," Inventors: Mark Grayson, et al.
U.S. Appl. No. 14/686,598, filed Apr. 14, 2015, entitled "System and Method for Providing Uplink Inter Cell Interference Coordination in a Network Environment," Inventors: Ritesh K. Madan, et al.
U.S. Appl. No. 14/691,260, filed Apr. 20, 2015, entitled "System and Method for Providing Uplink Inter Cell Interference Coordination in a Network Environment," Inventors: Ritesh K. Madan, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.
U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 14/961,552, filed Dec. 7, 2015, entitled "System and Method to Provide Uplink Interference Coordination in a Network Environment," Inventor: Ritesh K. Madan.
U.S. Appl. No. 14/993,859, filed Jan. 12, 2016, entitled "System and Method to Facilitate Centralized Radio Resource Management in a Split Radio Access Network Environment," Inventor: Ritesh K. Madan.
U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.
U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.
U.S. Appl. No. 15/018,677, filed Febuary 8, 2016, entitled "Mitigation of Uplink Interference Within Heterogeneous Wireless Commmunications Networks," Inventor: Pankaj Uplenchwar, et al.
U.S. Appl. No. 14/801,381, filed Jul. 16, 2015, entitled "System and Method to Manage Network Utilization According to Wireless Backhaul and Radio Access Network Conditions," Inventor: Ishwardutt Parulkar.
U.S. Appl. No. 15/251,471, filed Aug. 30, 2016, entitled "Method and Apparatus for Reducing Inter-Cell Interference," Inventor: Ziv Nuss, et al.
U.S. Appl. No. 15/335,931, filed Oct. 27, 2016, entitled "Power Setting," Inventor: Pankaj Uplenchwar, et al.
U.S. Appl. No. 15/089,252, filed Apr. 1, 2016, entitled "Method and System for Dynamic Allocation of Resources in a Cellular Network,".
EPO Nov. 21, 2016 Extended Search Report and Written Opinion from European Application Serial No. 16180195.6; 9 pages.
Liu, Jianquo, et al., "Uplink Power Control and Interference Foordination for Heterogeneous Network," 2012 IEEE 23rd International Symposium on Personal, Indoor and mobile Radio Communications, Sydney, Australia, Sep. 9-12, 2012; 5 pages.
U.S. Appl. No. 15/374,903, filed Dec. 9, 2016, entitled "Power Management in a Cellular System," Inventors: Alan James Auchmuty Carter, et al.

* cited by examiner

INTERFERENCE CONTROL IN A CELLULAR COMMUNICATIONS NETWORK

TECHNICAL FIELD

This disclosure relates to a cellular communications network, and in particular to a base station for use in the network, and a method of controlling interference between cells of the network.

BACKGROUND

It is well known that interference between cells is a significant problem in cellular radio access networks. In particular, a base station may suffer from interference on its uplink (that is, it may have difficulty in receiving signals from user equipment devices that have an active connection to the base station, or are trying to establish a connection). In cellular systems, uplink interference generally falls into two main categories: intra-cell interference, caused by user equipment devices transmitting on the same cell; and inter-cell interference, caused by user equipment devices transmitting on adjacent cells. This uplink interference may cause service degradation for the user equipment devices that are connected to the cell that is suffering from the interference. If the base station reacts to this by requiring its connected user equipments to increase their transmit power, these transmissions will in turn cause further uplink interference, which may cause the system to enter an unstable state that will eventually cause the user equipment devices experiencing the weakest links to lose their connection to the system.

This problem is particularly pronounced in frequency reuse-1 systems, where the same frequency is used for transmissions on neighbouring cells.

Intra-cell interference is sometimes referred to as controlled interference, as the affected cell is in charge of allocating the uplink resources and can therefore regulate the uplink interference if necessary. Inter-cell interference is sometimes referred to as uncontrolled interference, as the affected cell is generally not in charge of allocating the uplink resources assigned by adjacent cells.

One possibility to limit uplink interference problems, in Code Division Multiple Access (CDMA) based cellular systems, is the technique of soft handover, whereby a user equipment device may have simultaneous connections to multiple cells, so that each of those cells can control the uplink transmit power of the user equipment device. The base station that experiences the best instantaneous link with the user equipment device will then govern the transmit power. Soft handover reduces the scale of the problem of uplink interference, but in practice it does not eliminate the problem, because the decision as to which of the multiple cells is allowed to control the uplink transmissions of the user equipment is often based on downlink pilot measurements, and these are not necessarily representative of the UL conditions. In any event, using soft handover is not always practical, for example because of capacity issues in one of the affected cells. Implementing soft handover also adds cost, which is undesirable.

Another possibility to limit uplink interference problems, in Orthogonal Frequency Division Multiple Access (OFDMA) based cellular systems, is to apply inter-cell interference control, so that a victim of high uplink interference can notify neighbouring cells about the condition. This enables the aggressor to apply any necessary corrective action, such as altering the way in which it schedules frequency/and or time resources. These techniques, however, are blind techniques, which take no account of user equipment measurements, and rely on blanket actions, such as preventing user equipment devices at the edge of a call from using certain resources. These techniques also assume that there is an established relationship between the victim and the aggressor, in such a way that the victim communicates directly with the aggressor or a set of assumed aggressors, without any further qualification as to whether the recipient is actually contributing towards interference in the victim cell.

DETAILED DESCRIPTION OF EXAMPLE EMBODIMENTS

Overview

According to a first aspect of the present disclosure, there is provided a method of controlling a communications network, the method comprising, in a first base station of the network:

determining that the first base station is suffering from uncontrolled interference from at least one other base station of the network;

based on information received from at least one other base station of the network regarding estimates of interference caused at the first base station by at least one user equipment device connected to the respective other base station, selecting a proposed action to mitigate said interference; and notifying the respective other base station of the selection of the proposed action.

According to a second aspect of the present disclosure, there is provided a computer program product, comprising code for causing a processor to perform a method in accordance with the first aspect.

According to a third aspect of the present disclosure, there is provided a basestation for a cellular communications network, configured to perform a method in accordance with the first aspect.

This has the advantage that the basestations can co-operate in order to reduce interference levels in the network.

Example Embodiments

Figure 1:
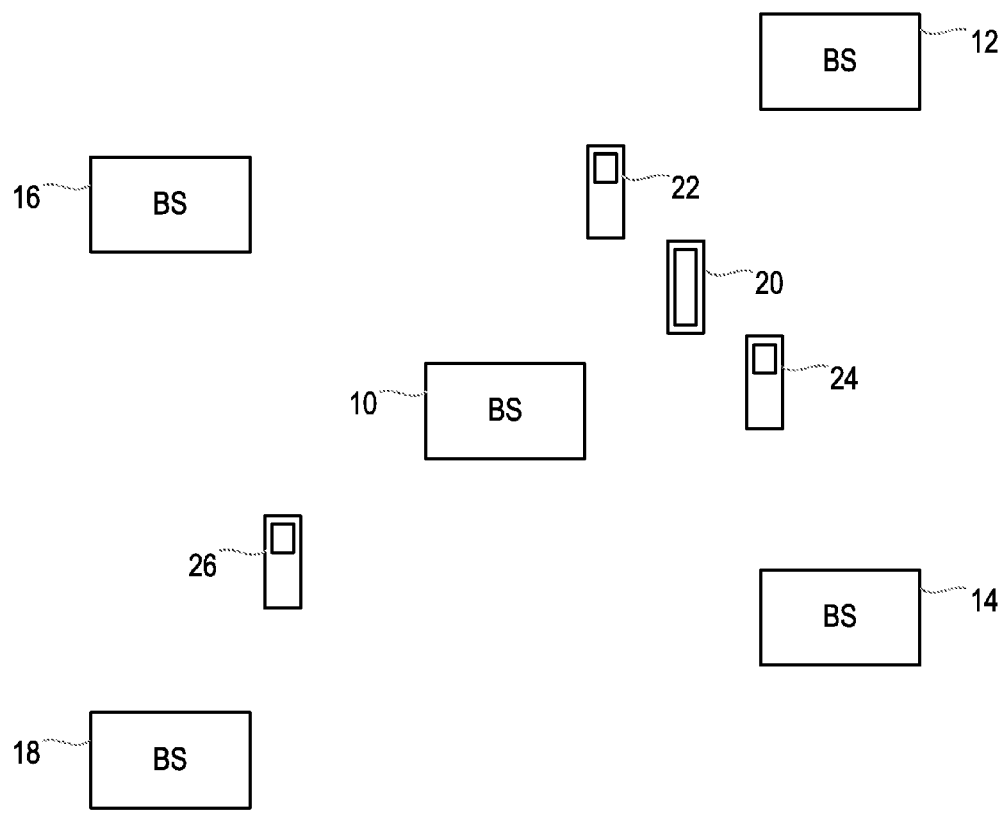
FIG. 1 illustrates a part of a cellular communications network.

FIG. 1 illustrates a part of a cellular communications network.

Specifically, FIG. 1 shows a part of the cellular radio access network, including base stations (BS) 10, 12, 14, 16, 18. The base stations 10, 12, 14, 16, 18 could be in a grid of small cells with direct connections between them, or they could be macrolayer base stations, or they could be part of a heterogeneous network (HetNet) of different types of access nodes, or any other type of base station. In addition, FIG. 1 shows multiple user equipment (UE) devices 20, 22, 24, 26, such as mobile phones, laptop computers, tablet computers etc that are in the vicinity of one or more of the base stations 10, 12, 14, 16, 18 and can obtain mobile communication services by establishing a connection into the mobile network through a base station.

It will of course be understood that a typical cellular communications network will include many more base stations than those shown in FIG. 1, but this is sufficient for an explanation of the present disclosure. It will also be understood that a cellular communications network will typically have many more active UEs than those shown in FIG. 1, but this is sufficient for an explanation of the present disclosure.

The cellular communications network may use any cellular access system, such as Code Division Multiple Access (CDMA) or Orthogonal Frequency Division Multiple Access (OFDMA), but the benefits of the present disclosure are most evident in systems in which adjacent cells use the same carrier frequency (so called "frequency re-use 1" systems), such as Wideband Code Division Multiple Access (WCDMA) and Long Term Evolution (LTE) radio access networks.

Figure 2:
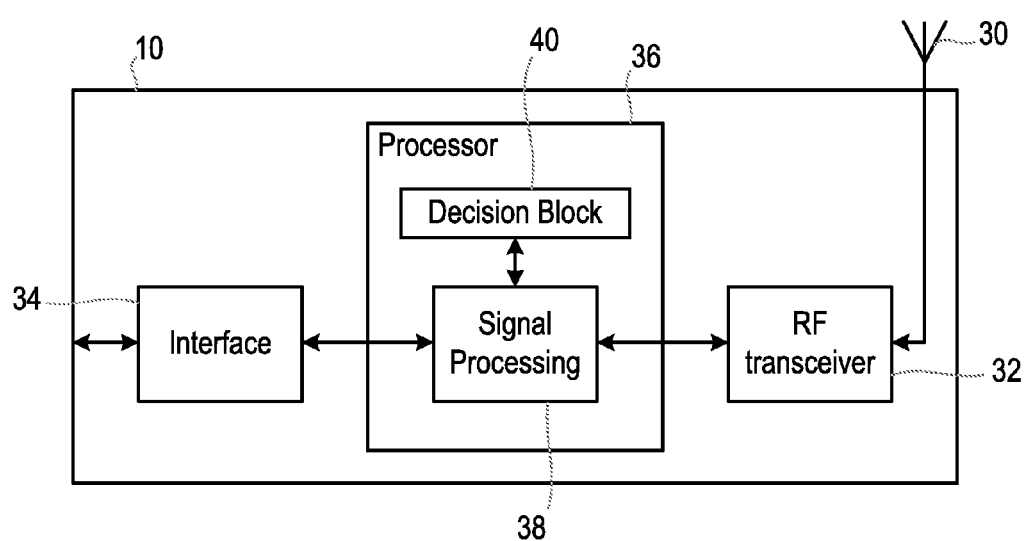
FIG. 2 is a block schematic diagram showing a base station in accordance with one embodiment of the disclosure.

FIG. 2 is a block schematic diagram, illustrating the general form of the base station 10, it being understood that the other base stations 12, 14, 16, 18 may be generally similar.

FIG. 2 shows the base station 10, having an antenna 30 connected to radio frequency (RF) transceiver circuitry 32, for transmitting and receiving radio frequency signals in communication with UE devices.

The base station 10 also has an interface 34 for communication with a core network of the cellular mobile communications network. The interface 34 may be adapted to send and receive signals over any suitable communications link, for example over a public wide area network such as the internet, or over a dedicated wired connection, or over a wireless connection.

A processor 36 has signal processing functionality 38 for extracting information from signals received either from the interface 34 or from the RF transceiver 32, and for then putting signals into the format required for transmission over the air interface from the antenna 30, or for transmission over the interface 34 to the core network, as the case may be. Additional signal processing may be carried out in the signal processing block 38, for example to alter the content and/or format of the signals being transmitted.

The processor 36 also has a decision block 40, which is able to extract information from the signals passing through the signal processing block 38, and is able to control the signals that are transmitted based on analysis of such signals. In particular, the processor 36 is provided with software for controlling the operation of the base station 10 in such a way as to mitigate uplink interference affecting the base station, and affecting other nearby base stations. It will be recognised that the processor 36 has other functions required for operation of the base station 10 in the cellular mobile communications network, but it is not necessary to describe these other functions for an understanding of the present disclosure.

Figure 3:
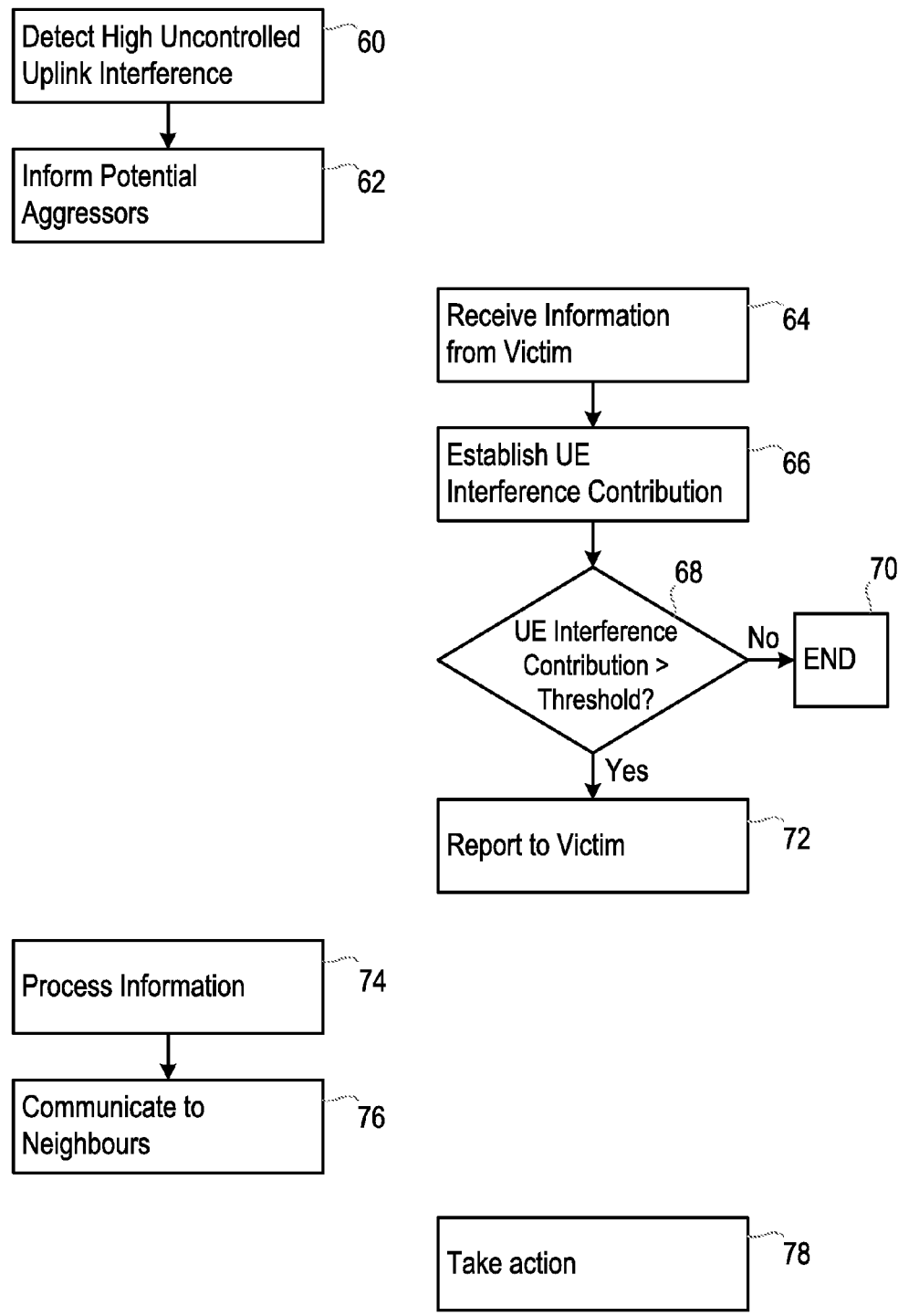
FIG. 3 is a flow chart illustrating a method in accordance with one embodiment of the disclosure.

FIG. 3 is a flow chart, illustrating a method performed in the base stations 10, 12, 14, 16, 18.

In step 60, one of the base stations, for example the base station 10, detects a high level of uncontrolled uplink interference. For example, the uncontrolled uplink interference can be determined by calculating a measure of interference in the cell. This includes controlled (intra-cell) and uncontrolled (inter-cell) interference, and the level of controlled interference can be estimated because the strengths of the signals received from the user equipment devices in the cell can be measured. The level of uncontrolled interference is the difference between the measure of interference and the estimated controlled interference. The level of uncontrolled interference can then be compared with a threshold value to determine whether it exceeds that threshold value. If so, the base station 10 determines that it is a victim of uncontrolled uplink interference.

In step 62, the victim base station 10 informs other base stations that might be the source of the high level of uncontrolled uplink interference (that is, the potential aggressors) about the condition.

Such notification might simply be a message to indicate that the base station 10 is a victim of uncontrolled uplink interference. However, other relevant information may also be included. For example, in OFDMA-based systems, the victim may indicate which specific resource blocks are suffering interference. As another example, the notification may provide more detailed information about the level of interference being suffered.

In an LTE Radio Access Network, the victim base station 10 and the other base stations may communicate over the X2 interface. In a WCDMA Radio Access Network, the base stations may communicate over an interface equivalent to the X2 interface. Where the base stations form part of a grid of small cells, there is typically a peer-to-peer channel that can be used for this purpose.

Each base station 10, 12, 14, 16, 18 might be statically or semi-statically configured with a list of potential aggressor base stations to be notified in step 62 in the event of high uncontrolled uplink interference. Such a list might for example be determined based on the proximity of the other base stations to the relevant base station.

Figure 4:
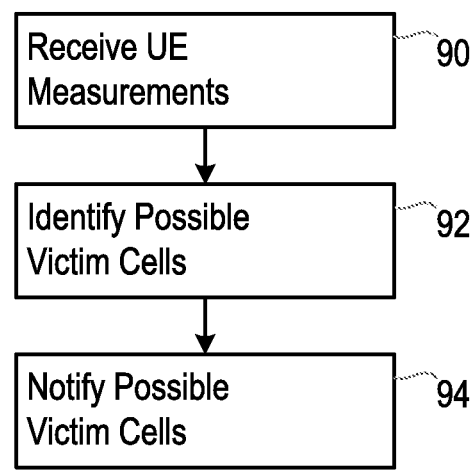
FIG. 4 is a flow chart illustrating a further method in accordance with an aspect of the disclosure.

Alternatively, the list of potential aggressor base stations may be established dynamically and proactively by each base station. FIG. 4 is a flow chart illustrating a method by which a base station can determine that it is a potential aggressor base station. This process is proactive, in the sense that it takes place before there is any detection of uncontrolled uplink interference, and is dynamic, in the sense that the list can be altered in response to a changing radio environment.

In the process shown in FIG. 4, in step 90, a base station receives measurements from the user equipment devices that have active connections to it, and which it therefore controls. Specifically, the base station receives the following information from each of the UEs that it controls:

the transmit power (Ptxul) of the UE;

measurement reports indicating the received signal strength (Prxdl) of the downlink pilot/reference signal transmitted by the serving cell and other neighbouring cells and received by the UE; and the resources used by the UE (for example the resource blocks in the case of an LTE network).

In step 92, the base station calculates, for each UE and for each base station whose transmissions are detected by that UE, the noise rise contribution generated by that UE in the respective neighbouring cell. Specifically, the noise rise can be calculated as follows:

$$\text{Noise Rise} = \{Ptxul - (Ptxdl - Prxdl)\}/Pn,$$

where:

Ptxul and Prxdl are defined as above,

Ptxdl is the transmit power of the downlink pilot/reference signal of the neighbouring cell, and Pn is the noise floor at the neighbouring cell. Ptxdl and Pn can for example be determined by the base station by listening for signals transmitted by the neighbouring base station, by directly exchanging information with the neighbouring base station, or otherwise, or suitable values can be pre-set.

In other words, the noise rise contributed by the UE in the neighbouring cell is equal to the transmit power of the UE, from which is subtracted the uplink path loss between the UE and the neighbouring cell. The uplink path loss can be assumed to be equal to the downlink path loss, and therefore equal to the difference between the transmit power of the neighbouring base station and the received signal strength at the UE.

If the calculated noise rise exceeds a threshold value, then the base station recognises that it might be a source of excessive uncontrolled interference in the respective neighbouring cell. Then, in step 94, the base station informs each neighbouring cell that is identified in this way that it has one or more UEs that it is controlling that may contribute to increased interference in the neighbouring cell.

In the case of LTE (or, more generally, any OFDM based access technology), a base station that recognises that it is a potential aggressor may also indicate to the potential victim which resource blocks are in use by the said UEs, and whether the resource block allocations are static or dynamic.

Each base station may usefully perform steps 90 and 92 repeatedly, notifying the potential victim base station if it newly determines that it is a potential aggressor. Equally, once a base station has notified the potential victim base station that it is a potential aggressor, it should also notify the potential victim if the calculated noise rise no longer meets the set threshold.

Having received this message, the potential victim base station decides whether to add the base station from which it received the message to its list of potential aggressor base stations. In fact, the potential victim base station adds the base station from which it received the message to its list of potential aggressor base stations in most situations.

Returning to the process shown in FIG. 3, it was mentioned above that, in step 62, the victim base station 10 informs other base stations that might be the source of the high level of uncontrolled uplink interference (that is, the potential aggressors) about the condition.

The notification may simply inform the possible aggressors that it is suffering from uncontrolled interference, and ask the possible aggressors for information about UEs that may be contributing to that interference. Alternatively, the notification may request information about UEs whose contribution to the interference (possibly on a specified set of uplink resources) exceeds a specified level.

In step 64, each of the base stations 12, 14, 16, 18 notified by the victim base station 10 in step 62 receives that notification.

In step 66, each of the base stations 12, 14, 16, 18 determines the contribution, made by the respective UEs with which it has an active connection, to the interference detected by the victim 10. That is, the base stations 12, 14, 16, 18 determine the noise signal levels caused by their respective UEs at the victim 10. As described above, this contribution is calculated based on the reported UE transmit power, the estimated path loss between the UE and the victim 10 (which can be calculated based on UE measurement reports).

In addition, the extent of the transmission overlap can be taken into account. For example, in the case of a WCDMA network in which the victim base station is using a carrier frequency band that only partially overlaps with the carrier frequency band used by the potential aggressor, the effect of the interference will be correspondingly lower. Thus, the potential aggressor can establish the degree of overlap based on the respective channel numbers (more specifically, in the case of a UMTS network, the UTRA Absolute Radio Frequency Channel Numbers, or UARFCN, where UTRA stands for UMTS Terrestrial Radio Access) of the aggressor and the victim. If there are any offsets, then the potential aggressor should apply an adjustment to the noise rise calculation, to arrive at an Adjusted Noise Rise as the product of the calculated Noise Rise, and an overlap factor, where 100% represents full overlap between the UARFCNs used by the potential aggressor and potential victim and 0% represents no overlap. This avoids any unnecessary notifications to the victim.

When, in the case of an LTE (or other OFDM) network, the notification from the victim requests information about UEs whose contribution to the interference on a specified set of uplink resources exceeds a specified level, the specified set of uplink resources may be in use by various UEs (depending on the uplink scheduler). In that case, the potential aggressor can estimate the noise rise contribution towards the victim by averaging the UE power contributions over the affected resource blocks.

In step 68, each of the base stations 12, 14, 16, 18 determines whether any of the respective UEs with which it has an active connection is making a contribution towards the interference detected by the victim 10 that exceeds a set threshold. The threshold may be set permanently. Alternatively, as mentioned above with reference to step 62, the notification sent from the victim may request information about UEs whose contribution to the interference exceeds a specified level.

If one of the base stations 12, 14, 16, 18 determines that its UEs are making an interference contribution that is below the set threshold, then the process followed by that base station passes to step 70, in which it ends.

However, if any of the base stations 12, 14, 16, 18 determines that its UEs are making an interference contribution that is above the set threshold, then the process followed by that base station passes to step 72, and the base station sends a message to the victim base station 10, informing it of the estimated interference contribution. The message sent by each potential aggressor also informs the victim of any actions which can be taken by the aggressor to reduce the interference towards the victim.

Depending on the circumstances that have given rise to the interference, the steps that might be taken include the following:

reducing the uplink data rate of one or more UE that is causing the interference contribution to exceed the threshold, as this reduction will reduce the respective UE transmit power and therefore reduce the interference caused by that UE;

in the case of an LTE network, where each UE has a resource allocation in terms of frequency and/or time resources, changing the resource allocation of one or more UE that is causing the interference contribution to exceed the threshold;

handing the relevant UE over to a different frequency or radio access technology (RAT);

expediting the handover of the relevant UE to a different cell (which in some cases may be the current victim cell served by the base station 10); or even dropping a call (in particular a packet switched call in the case of a WCDMA network) involving the UE that is causing the interference contribution to exceed the threshold, if it is not possible to hand the relevant UE over to a different frequency or radio access technology, and if this interference is preventing the victim base station from handling a high priority or emergency call.

In step 74, the victim base station 10 processes the information received from the base stations 12, 14, 16, 18. There may be reports received from multiple aggressor base stations, each proposing multiple actions to mitigate the interference effect. The victim cell therefore consolidates these reports and determines which action or actions are likely to produce the desired reduction in uplink interference.

For example, the victim may set a target noise rise reduction, and then identify which action or actions will achieve this level of reduction. If more than one action (or set of actions) is identified, the victim may for example select the action (or set of actions) having the lowest impact on the aggressor (for example based on a pre-set "cost" ranking).

The victim base station may determine that multiple actions are required in order to reduce the uplink interference to an acceptable level, and may notify the aggressor or aggressors accordingly. As another example, even when the victim base station determines that multiple actions may be required to reduce the uplink interference to an acceptable level, it may select just one action for initial implementation, to be followed by one or more further action if re-analysis determines that such is necessary.

In step 76, the victim base station 10 then communicates the selected action or set of actions back to the relevant base stations in the group of potential aggressors 12, 14, 16, 18.

In step 78, the respective one or more of the base stations 12, 14, 16, 18 receives the notification from the victim base station 10, and takes appropriate action. In some cases, the action may involve making a persistent change. For example, if it is decided to reduce the interference problem by handing over a UE to an alternative base station, this may be achieved by making persistent changes to the mobility parameters in the base station 12, 14, 16, 18. This would be particularly useful if the interference problem were a recurring problem.

Thus, FIG. 3 illustrates a method in which the victim obtains information from a predetermined set of potential aggressors, which then report the actions that they can take in order to reduce the uncontrolled uplink interference affecting the victim. FIG. 4 extends this by illustrating that the set of potential aggressors is updated dynamically based on reports sent from the potential aggressors to the victim.

Figure 5:
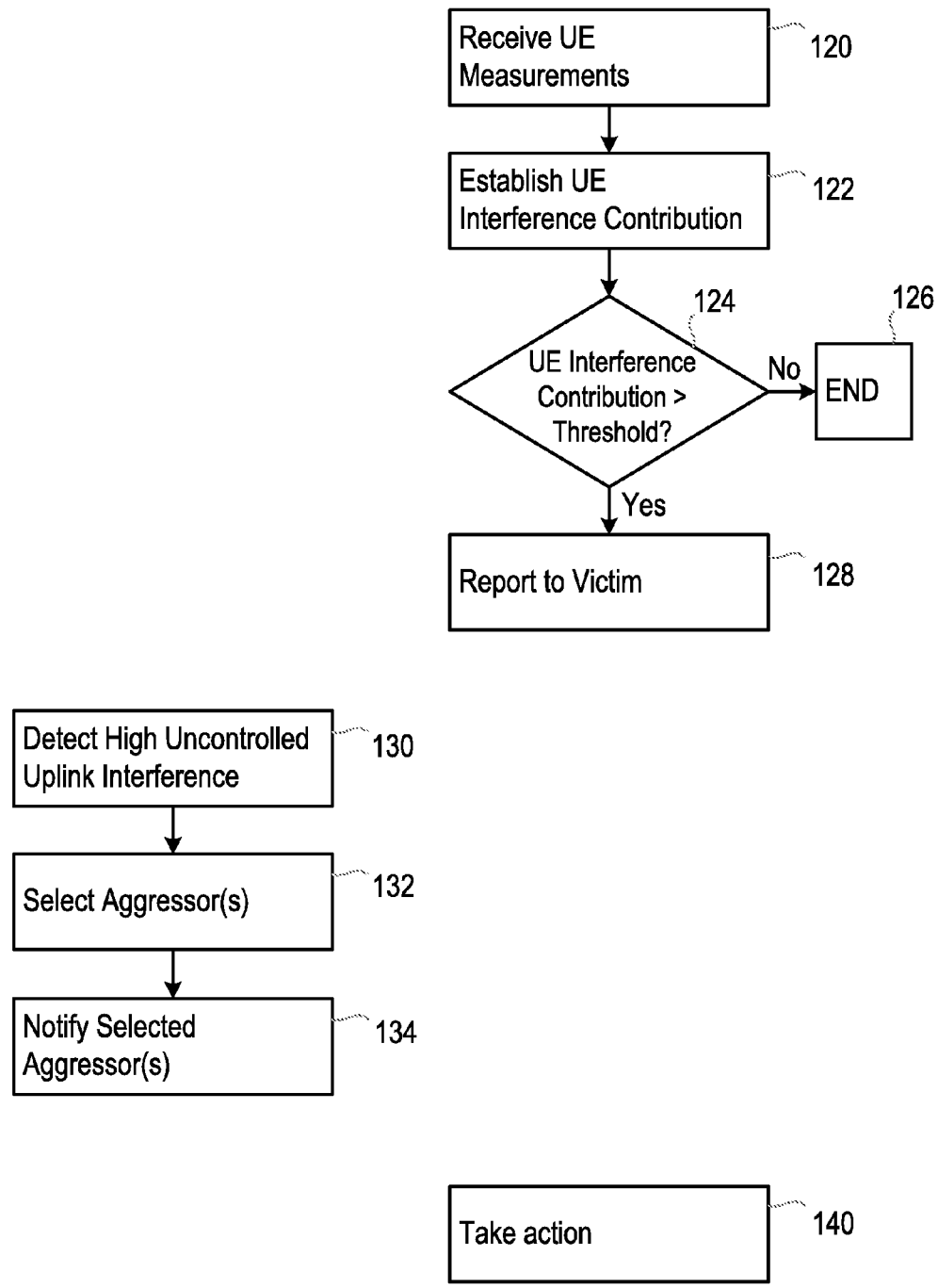
FIG. 5 is a flow chart illustrating a further method in accordance with an aspect of the disclosure.

FIG. 5 is a flow chart illustrating a method in which this is extended still further, in that the potential aggressors notify the potential victim in advance of the uplink interference that they may be causing.

In the process shown in FIG. 5, in step 120, a base station, for example the base station 12, receives measurements from the user equipment devices that have active connections to it, and which it therefore controls. Specifically, the base station receives the following information from each of the UEs that it controls:

the transmit power (Ptxul) of the UE;

measurement reports indicating the received signal strength (Prxdl) of the downlink pilot/reference signal transmitted by the serving cell and other neighbouring cells and received by the UE; and the resources used by the UE (for example the resource blocks in the case of an LTE network).

In step 122, the base station calculates, for each UE and for each base station whose transmissions are detected by that UE, the noise rise contribution generated by that UE in the respective neighbouring cell. Specifically, the noise rise can be calculated as follows:

$$\text{Noise Rise} = \{Ptxul - (Ptxdl - Prxdl)\}/Pn,$$

where:

Ptxul and Prxdl are defined as above,

Ptxdl is the transmit power of the downlink pilot/reference signal of the neighbouring cell, and Pn is the noise floor at the neighbouring cell. Ptxdl and Pn can for example be determined by the base station by listening for signals transmitted by the neighbouring base station, by directly exchanging information with the neighbouring base station, or otherwise, or suitable values can be pre-set.

In other words, the noise rise contributed by the UE in the neighbouring cell is equal to the transmit power of the UE, from which is subtracted the uplink path loss between the UE and the neighbouring cell. The uplink path loss can be assumed to be equal to the downlink path loss, and therefore equal to the difference between the transmit power of the neighbouring base station and the received signal strength at the UE.

In step 124, it is determined if the calculated noise rise exceeds a threshold value. If not, the process passes to step 126, and no further action is taken. However, if one of the calculated noise rises exceeds a threshold value, then the base station recognises that it might be a source of excessive uncontrolled interference in the respective neighbouring cell. Then, in step 128, the base station informs each potential victim neighbouring cell that is identified in this way that it has one or more UEs that it is controlling that may contribute to increased interference in the neighbouring cell.

In step 128, the potential aggressor also sends to the potential victim all information relevant for each individual remedial action that it could take, such that the victim has all the necessary information in order to select a desired action. In the case of LTE (or, more generally, any OFDM based access technology), a base station that recognises that it is a potential aggressor may also indicate to the potential victim which resource blocks are in use by the said UEs, and whether the resource block allocations are static or dynamic.

Each base station may usefully perform steps 120, 122 and 124 frequently, such that the victim has up-to-date information regarding the conditions at the aggressor. The aggressor preferably notifies the potential victim base station whenever it newly determines that it is a potential aggressor. Equally, once a base station has notified the potential victim base station that it is a potential aggressor, it should also notify the potential victim if the calculated noise rise no longer meets the set threshold.

In step 130, another of the base stations, for example the base station 10, detects a high level of uncontrolled uplink interference. For example, the uncontrolled uplink interference can be determined by calculating a measure of interference in the cell. This includes controlled (intra-cell) and uncontrolled (inter-cell) interference, and the level of controlled interference can be estimated because the strengths of the signals received from the user equipment devices in the cell can be measured. The level of uncontrolled interference is the difference between the measure of interference and the estimated controlled interference. The level of uncontrolled interference can then be compared with a threshold value to determine whether it exceeds that threshold value. If so, the base station 10 determines that it is a victim of uncontrolled uplink interference.

In this process, the base station 10 will already have received notifications from at least one aggressor base station, providing information about the UE or UEs causing the noise rise, and providing information about the actions that could be taken to mitigate this.

For example, the actions that might be taken include:

reducing the uplink data rate of one or more UE that is causing the interference contribution to exceed the threshold, as this reduction will reduce the respective UE transmit power and therefore reduce the interference caused by that UE;

in the case of an LTE network, where each UE has a resource allocation in terms of frequency and/or time resources, changing the resource allocation of one or more UE that is causing the interference contribution to exceed the threshold;

handing the relevant UE over to a different frequency or radio access technology (RAT);

expediting the handover of the relevant UE to a different cell (which in some cases may be the current victim cell served by the base station 10); or even dropping a call (in particular a packet switched call in the case of a WCDMA network) involving the UE that is causing the interference contribution to exceed the threshold, if it is not possible to hand the relevant UE over to a different frequency or radio access technology, and if this interference is preventing the victim base station from handling a high priority or emergency call.

In step 132, the victim base station 10 selects one of the actions that has been suggested by the aggressor or aggressors. For example, the victim may set a target noise rise reduction, and then identify which action or actions will achieve this level of reduction. If more than one action (or set of actions) is identified, the victim may for example selects the action (or set of actions) having the lowest impact on the respective aggressor (for example based on a pre-set "cost" ranking).

In step 134, the victim base station 10 notifies the respective aggressor or aggressors of the action or actions that it has selected.

In step 140, the or each aggressor receives the notification from the victim, and takes the requested action to mitigate the interference.

Thus, the system described herein helps to avoid unnecessary degradations in key performance indicators caused by uncontrolled uplink interference generated by neighbouring cells.

The invention claimed is:

1. A method of controlling a communications network, the method comprising, in a first base station of the network:
   determining, using an electronic processor of the first base station, that the first base station is suffering from uncontrolled interference from at least one other base station of the network;
   requesting information from the at least one other base station and a plurality of other base stations of the network regarding estimates of uplink interference caused at the first base station by at least one user equipment device connected to the at least one other base station;
   based on information received, at least in part, from the at least one other base station of the network regarding an estimate of uplink interference caused at the first base station by at least one user equipment device connected to the at least one other base station, selecting a proposed action to mitigate said uncontrolled interference, wherein the estimate of uplink interference comprises an estimate of noise rise contribution of the at least one user equipment device toward the first base station and wherein the estimate of noise rise contribution is calculated based on an uplink transmit power of the at least one user equipment device from which is subtracted a quantity comprising a received downlink signal strength of a pilot signal of the first base station as measured by the at least one user equipment device subtracted from a downlink transmit power of the first base station and wherein a result of the subtraction of the quantity from the uplink transmit power of the at least one user equipment device is divided by a noise floor of the first base station; and
   notifying at least one other base station of the selection of the proposed action.

2. The method of claim 1, wherein the plurality of other base stations are selected based on a proximity of each of the plurality of other base stations to the first base station.

3. The method of claim 1, wherein the plurality of other base stations are selected based on information received from the plurality of other base stations.

4. The method of claim 1, further comprising:
   requesting information regarding respective proposed actions to mitigate said uncontrolled interference.

5. The method of claim 1, further comprising: og6
   receiving information from at least one other different base station of the network regarding estimates of uplink interference caused at the first base station by at least one user equipment device connected to the at least one other different base station;
   subsequently determining that the first base station is suffering from uncontrolled interference from at least one other different base station of the network; and
   subsequently, based on the received information, selecting a proposed action to mitigate said uncontrolled interference.

6. The method of claim 5, wherein the received information from the at least one other different base station of the network regarding estimates of uplink interference caused at the first base station by the at least one user equipment device connected to the at least one other different base station further comprises information regarding respective proposed actions to mitigate said uncontrolled interference.

7. The method of claim 1, wherein the proposed action to mitigate said uncontrolled interference is selected from a list comprising:
   reducing an uplink data rate of one or more UE that is causing said uncontrolled interference;
   changing at least one of a frequency and a time resource allocation of one or more UE that is causing said uncontrolled interference;
   handing over to a different frequency or radio access technology a UE that is causing said uncontrolled interference;
   expediting a handover of a UE that is causing said uncontrolled interference to a different cell; and
   dropping a call involving a UE that is causing said uncontrolled interference to exceed a threshold.

8. A computer program product comprising code for execution by an electronic processor of a first base station for causing the processor to:
   determine that the first base station is suffering from uncontrolled interference from at least one other base station of a network;

request information from the at least one other base station and a plurality of other base stations of the network regarding estimates of uplink interference caused at the first base station by at least one user equipment device connected to the at least one other base station;

based on information received, at least in part, from the at least one other base station of the network regarding an estimate of uplink interference caused at the first base station by at least one user equipment device connected to the at least one other base station, select a proposed action to mitigate said uncontrolled interference, wherein the estimate of uplink interference comprises an estimate of noise rise contribution of the at least one user equipment device toward the first base station and wherein the estimate of noise rise contribution is calculated based on an uplink transmit power of the at least one user equipment device from which is subtracted a quantity comprising a received downlink signal strength of a pilot signal of the first base station as measured by the at least one user equipment device subtracted from a downlink transmit power of the first base station and wherein a result of the subtraction of the quantity from the uplink transmit power of the at least one user equipment device is divided by a noise floor of the first base station; and notify at least one other base station of the selection of the proposed action.

9. The computer program product of claim 8, wherein the plurality of other base stations are selected based on a proximity of each of the plurality of other base stations to the first base station.

10. The computer program product of claim 8, wherein the plurality of other base stations are selected based on information received from the plurality of other base stations.

11. The computer program product of claim 8, further comprising code for execution by the electronic processor of the first base station for causing the processor to:
request information regarding respective proposed actions to mitigate said uncontrolled interference.

12. The computer program product of claim 8, further comprising code for execution by the electronic processor of the first base station for causing the processor to:
receive information from at least one other different base station of the network regarding estimates of uplink interference caused at the first base station by at least one user equipment device connected to the at least one other different base station;
subsequently determine that the first base station is suffering from uncontrolled interference from at least one other different base station of the network; and
subsequently, based on the received information, select a proposed action to mitigate said uncontrolled interference.

13. The computer program product of claim 12, wherein the received information from the at least one other different base station of the network regarding estimates of uplink interference caused at the first base station by the at least one user equipment device connected to the at least one other different base station further comprises information regarding respective proposed actions to mitigate said uncontrolled interference.

14. The computer program product of claim 8, wherein the proposed action to mitigate said uncontrolled interference is selected from a list comprising:

reducing an uplink data rate of one or more UE that is causing said uncontrolled interference;
changing at least one of a frequency and a time resource allocation of one or more UE that is causing said uncontrolled interference;
handing over to a different frequency or radio access technology a UE that is causing said uncontrolled interference;
expediting a handover of a UE that is causing said uncontrolled interference to a different cell; and
dropping a call involving a UE that is causing said uncontrolled interference to exceed a threshold.

15. A first base station for a network, the first base station comprising:
an electronic processor that operates to execute instructions, wherein based on executing the instructions, the first base station operates to:
determine that the first base station is suffering from uncontrolled interference from at least one other base station of the network;
request information from the at least one other base station and a plurality of other base stations of the network regarding estimates of uplink interference caused at the first base station by at least one user equipment device connected to the at least one other base station;
based on information received, at least in part, from the at least one other base station of the network regarding an estimate of uplink interference caused at the first base station by at least one user equipment device connected to the at least one other base station, select a proposed action to mitigate said uncontrolled interference, wherein the estimate of uplink interference comprises an estimate of noise rise contribution of the at least one user equipment device toward the first base station and wherein the estimate of noise rise contribution is calculated based on an uplink transmit power of the at least one user equipment device from which is subtracted a quantity comprising a received downlink signal strength of a pilot signal of the first base station as measured by the at least one user equipment device subtracted from a downlink transmit power of the first base station and wherein a result of the subtraction of the quantity from the uplink transmit power of the at least one user equipment device is divided by a noise floor of the first base station; and
notify at least one other base station of the selection of the proposed action.

16. The first base station of claim 15, wherein the plurality of other base stations are selected based on a proximity of each of the plurality of other base stations to the first base station.

17. The first base station of claim 15, wherein the plurality of other base stations are selected based on information received from the plurality of other base stations.

18. The first base station of claim 15, wherein the first base station further operates to:
request information regarding respective proposed actions to mitigate said uncontrolled interference.

19. The first base station of claim 15, wherein the first base station further operates to:
receive information from at least one other different base station of the network regarding estimates of uplink interference caused at the first base station by at least one user equipment device connected to the at least one other different base station;

subsequently determine that the first base station is suffering from uncontrolled interference from at least one other different base station of the network; and subsequently, based on the received information, select a proposed action to mitigate said uncontrolled interference.

20. The first base station of claim 15, wherein the proposed action to mitigate said uncontrolled interference is selected from a list comprising:

reducing an uplink data rate of one or more UE that is causing said uncontrolled interference;

changing at least one of a frequency and a time resource allocation of one or more UE that is causing said uncontrolled interference;

handing over to a different frequency or radio access technology a UE that is causing said uncontrolled interference;

expediting a handover of a UE that is causing said uncontrolled interference to a different cell; and dropping a call involving a UE that is causing said uncontrolled interference to exceed a threshold.

* * * * *